(12) United States Patent
Shinozaki

(10) Patent No.: US 7,976,210 B2
(45) Date of Patent: Jul. 12, 2011

(54) DISPLAY DEVICE, LIGHT-EMITTING DEVICE, AND SOLID-STATE LIGHT-EMITTING ELEMENT SUBSTRATE

(75) Inventor: Kenji Shinozaki, Chiba (JP)

(73) Assignee: Showa Denko K.K., Tokyo (JP)

( * ) Notice: Subject to any disclaimer, the term of this patent is extended or adjusted under 35 U.S.C. 154(b) by 263 days.

(21) Appl. No.: 12/299,873

(22) PCT Filed: May 14, 2007

(86) PCT No.: PCT/JP2007/060299
§ 371 (c)(1),
(2), (4) Date: Nov. 6, 2008

(87) PCT Pub. No.: WO2007/136020
PCT Pub. Date: Nov. 29, 2007

(65) Prior Publication Data
US 2009/0109655 A1  Apr. 30, 2009

Related U.S. Application Data

(60) Provisional application No. 60/809,017, filed on May 30, 2006.

(30) Foreign Application Priority Data

May 18, 2006   (JP) ................................ 2006-139285

(51) Int. Cl.
*F21V 7/04* (2006.01)

(52) U.S. Cl. ...... 362/631; 362/97.1; 362/97.3; 362/227; 362/249.02; 362/612

(58) Field of Classification Search ........ 362/97.1–97.3, 362/227, 249.01–249.02, 294, 373, 612, 362/630–634
See application file for complete search history.

(56) References Cited

U.S. PATENT DOCUMENTS

2005/0243576 A1   11/2005  Park et al.
2007/0211205 A1*  9/2007  Shibata .................... 349/161

FOREIGN PATENT DOCUMENTS

| CN | 1763607 A | 4/2006 |
|---|---|---|
| JP | 2005-108544 A | 4/2005 |
| JP | 2005-167026 A | 6/2005 |
| JP | 2005-317480 A | 11/2005 |
| JP | 2005-322866 A | 11/2005 |
| JP | 2006-011239 A | 1/2006 |
| JP | 2006-120355 A | 5/2006 |

* cited by examiner

*Primary Examiner* — Stephen F Husar
*Assistant Examiner* — Meghan K Dunwiddie
(74) *Attorney, Agent, or Firm* — Sughrue Mion, PLLC

(57) ABSTRACT

The backlight system is provided with: a plurality of LED-substrates (12) equipped with a plurality of light emitting diodes (LEDs) (21), a circuit that supplies driving current to the plurality of light emitting diodes (LEDs) (21), and metallic film islands that conduct heat generated by the plurality of light emitting diodes (LEDs) (21); a backlight frame (11) that loads the plurality of LED-substrates (12); and bolts (17) that fix the plurality of LED-substrates (12) on the backlight frame (11) and that conduct heat through the metallic film islands to the backlight frame (11).

22 Claims, 4 Drawing Sheets

DISPLAY DEVICE, LIGHT-EMITTING DEVICE, AND SOLID-STATE LIGHT-EMITTING ELEMENT SUBSTRATE

TECHNICAL FIELD

The present invention relates to a display device, a light-emitting device, and a solid-state light-emitting element substrate. More specifically, it relates to a display device such as a liquid crystal display device, a backlight device that is used, for example, for liquid crystal display device employing light emitting diodes as a light source, and a solid-state light-emitting element substrate that mounts, for example, light emitting diodes as a light source.

BACKGROUND ART

In recent years, there have been widely used display devices, such as liquid crystal display devices, in which a backlight is used for illuminating a display panel from the rear or lateral side thereof. Among them, liquid crystal TVs and liquid crystal monitors employ fluorescent tubes, such as hot- or cold-cathode fluorescent tubes, in the backlights. The light-emitting devices such as fluorescent-tube backlights include a so-called direct-lighting type, in which fluorescent tubes are disposed in a plane directly beneath (on the rear side) a liquid crystal panel, and a so-called edge-lighting type, in which (a) fluorescent tube(s) is/are disposed along only two edges or one edge on a light guide plate made of transparent resins, and the incident light to the light guide plate is reflected on the reflecting portion disposed on the rear of the light guide plate to illuminate a liquid crystal panel.

The direct-lighting type has an advantage of securing high luminosity, but has a disadvantage of thick backlight structures caused by non-uniformity of the luminance of the fluorescent tubes. On the other hand, the edge-lighting type has an advantage of allowing thinner design than the direct-lighting type, but has a disadvantage of lower efficiency in light utilization. In view of these circumstances, as a substitute for the fluorescent-tube backlight, recently has been studied a backlight using a light emitting diode (LED), which is one of a solid-state light-emitting element, as a light source.

The use of LEDs can secure high luminosity at low electric power consumption in backlights for small-size displays such as liquid crystal displays for cellular phones. Such LED-backlights for liquid crystals have been so far used for small-size liquid crystal displays for cellular phones as described above, and nowadays such backlights are applied in wider fields covering from liquid crystal displays for car navigation systems to wide-screen TVs. In particular, attention is paid to backlights for wide-screen liquid crystal TVs composed of three types of LEDs corresponding to the three primary colors, red, blue, and green, because such backlights can reproduce wider range of color, thereby realizing high imaging quality.

In backlights for wide-screen liquid crystal TVs, it is required to array a number of LED chips in a direct-lighting configuration to meet the necessity of a large quantity of light. Currently, since the light-emitting efficiency (the conversion efficiency from electric energy to light energy) of LEDs is still 50% or less, hence over half of the energy input is transformed into heat. This heat elevates the temperature of LED chips, causing further decrease of the light-emitting efficiency and the shortening of lifetime of LEDs. Accordingly, it is desired to efficiently dissipate the heat generated by LEDs to the outside of the LEDs.

For example, Japanese Patent Application Laid-Open Publication No. 2006-11239 describes that, as a related art regarding LED light sources described in official gazettes, there is an art relating to an edge lighting-type backlight in which a mounted metallic film, a metallic wiring for driving, and a metallic film pattern are formed on the surface of a mounting substrate where an LED module is mounted, a heat-dissipating metallic film is formed on the rear of the mounting substrate, and the front and rear are connected via metallic through-holes to effectively suppress temperature elevation of the LED module itself.

Generally, LEDs are free from filament burning out, which is a problem of incandescent lamps, because a semiconductor itself emits light in LEDs. However, degradation of the LED element itself or the resin sealing the LED element decreases the light transmittance, thereby gradually lowering the luminosity. It is known that the degradation of the resin is accelerated by heat generated in the LED element. Particularly in LED-backlights for liquid crystal display device, a blue LED emitting shorter-wavelength light is often used, and such shorter-wavelength light, which has higher energy, further increases the degradation of the resin. If more driving current is supplied to the LED for keeping the display screen bright, the light intensity increases and the LED temperature becomes higher at the same time, thereby degrading the resin more severely.

In order to address the above problems, it could be possible that the heat dissipation of an LED-substrate is enhanced by attaching a heat-dissipating plate such as an aluminum plate to the rear of the LED-substrate, but the product price significantly rises, and hence this technology is not considered to meet the recent severe demand for cost reduction.

Furthermore, when LED-backlights are used for wide-screen liquid crystal TVs or wide-screen liquid crystal panels, it is preferred to dispose LEDs in a direct-lighting configuration to attain higher luminosity. In the direct-lighting system, directly beneath a liquid crystal panel, there are disposed plural units in each of which plural light emitting diodes for each of colors, red, green, and blue, are arrayed. On this occasion, it is not enough to take a measure for improving heat-dissipating efficiency in the single unit, and it is required to adopt heat-dissipating measure considering the neighboring units.

DISCLOSURE OF THE INVENTION

The present invention has been directed to address the foregoing technical issues and has an object to achieve efficient heat-dissipation in LED-substrates without increasing the product price and production cost.

In order to achieve the object, in the present invention, a display device including a display panel that displays images and a backlight that illuminates the display panel from the rear thereof, the backlight is provided with: a mounting substrate equipped with a plurality of solid-state light-emitting elements, a circuit that supplies driving current to the plurality of the solid-state light-emitting elements and a heat-conducting film that is disposed on the same surface as where the circuit is disposed and that conducts heat generated by the plurality of the solid-state light-emitting elements; a frame that loads the mounting substrate in such a manner that the plurality of the solid-state light-emitting elements are disposed facing to the display panel in a direct-lighting configuration; and a fixing member that fixes the mounting substrate on the frame and conducts the heat through the heat-conducting film to the frame.

The backlight is provided with a plurality of the mounting substrates, and each of the plurality of the mounting substrates is fixed on the frame with the fixing member so that the plurality of the solid-state light-emitting elements are almost uniformly distributed beneath the rear of the display panel, and the heat-conducting film disposed on each of the plurality of the mounting substrates conducts heat from the solid-state light-emitting elements mounted on neighboring mounting substrates when the mounting substrates are fixed on the frame.

This structure realizes that, for example, the solid-state light-emitting elements mounted on a periphery of a mounting substrate can be cooled via the heat-conducting film provided on the mounting substrate neighboring thereto. The heat-conducting film disposed on the mounting substrate is formed in the same process as the process in which the circuit is formed.

The mounting substrate is provided with a member having a hole which is formed in a region where the heat-conducting film spread.

The fixing member is a bolt that is made of a highly heat conductive material, and the fixing member fixes the mounting substrate on the frame via the member having a hole.

From another standpoint, a light-emitting device the present invention is applied to is provided with: a mounting substrate equipped with a plurality of solid-state light-emitting elements, a circuit that supplies driving current to the plurality of the solid-state light-emitting elements, and a heat-conducting film that conducts heat generated by any of the plurality of the solid-state light-emitting elements; a frame that loads the mounting substrate; and a fixing member that fixes the mounting substrate on the frame and that conducts the heat to the frame, the heat having been conducted to the heat-conducting film.

When the plurality of the mounting substrates are loaded on the frame, the plurality of the mounting substrates utilize a neighboring heat-conducting film that conducts the heat from the solid-state light-emitting elements disposed on neighboring mounting substrates. In this mounting substrate, when the heat-conducting film and the neighboring heat-conducting film are formed in the same process as the process that the circuit is formed in, the heat-conducting film and the neighboring heat-conducting film can be formed in a cost-effective manner.

The mounting substrate is provided with a member having a hole that is formed in a region where the heat-conducting film spreads.

The fixing member is made of a highly heat conductive material and the fixing member fixes the mounting substrate on the frame via the member having a hole.

The solid-state light-emitting element substrate the present invention is applied to is provided with: a mounting substrate; a plurality of solid-state light-emitting elements mounted on the mounting substrate; a circuit that is formed on the mounting substrate and that supplies driving current to the plurality of solid-state light-emitting elements; and a metallic film island that is formed in the same process as the process in which the circuit is formed and that dissipates heat generated by any of the plurality of the solid-state light-emitting elements.

It is preferred to further provide a member having a hole for fixing the mounting substrate on a frame in a region where the metallic film island spreads, since the heat conducted to the metallic film island spreads can be conducted to the frame via the member having the hole.

Furthermore, it is advantageous that the heat can be dissipated through the circuit, wherein the metallic film island is involved in the circuit.

EFFECT OF THE INVENTION

According to the present invention configured as described above, the heat generated by a solid-state light-emitting element on a mounting substrate can be effectively conducted to a frame.

BEST MODE FOR CARRYING OUT THE INVENTION

Hereinafter, exemplary embodiments of the present invention will be detailed with reference to the accompanying drawings.

Figure 1:
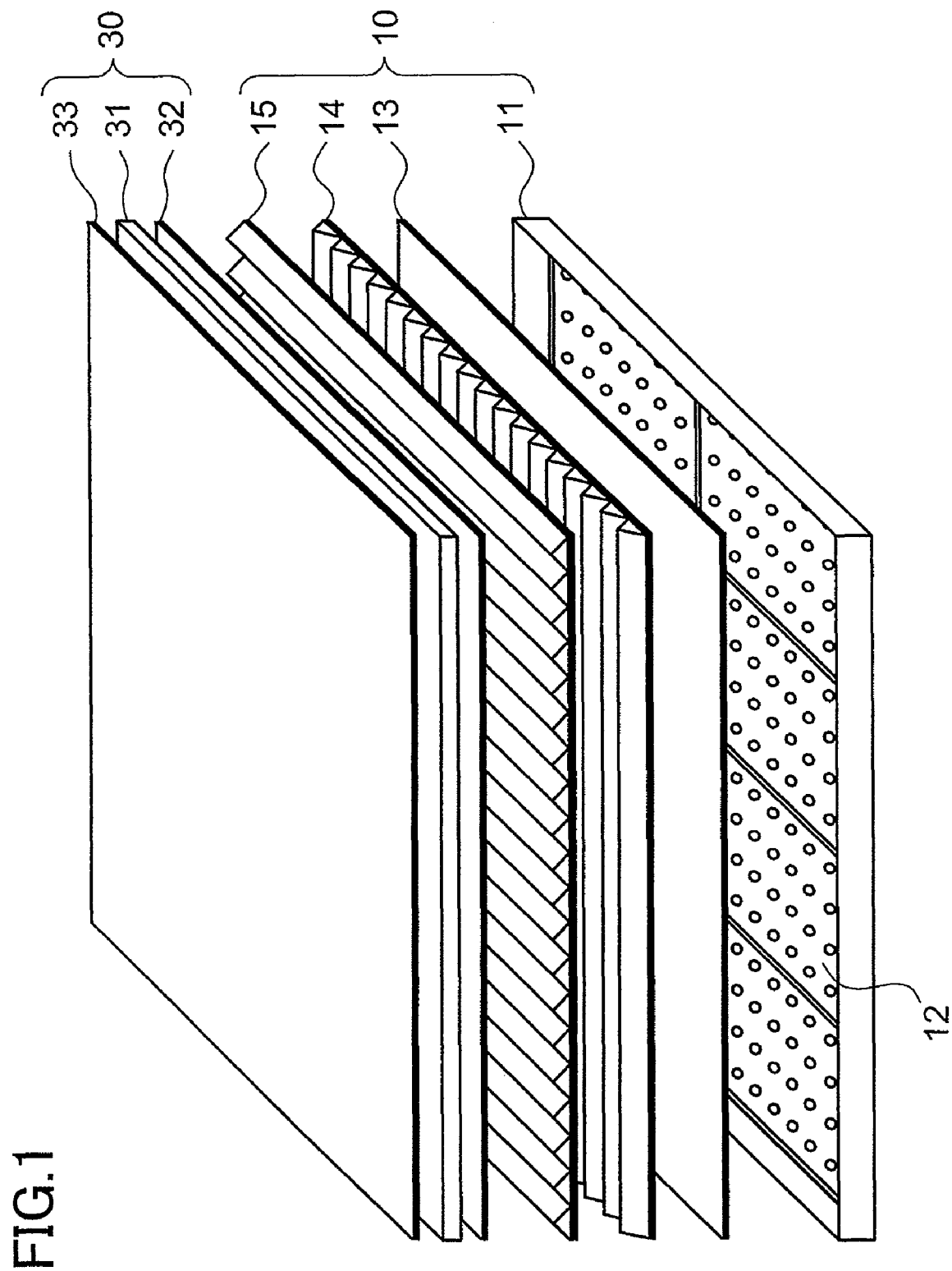
FIG. 1 illustrates the entire structure of a liquid crystal display device to which the exemplary embodiment of the present invention is applied.

FIG. 1 shows the entire structure of a liquid crystal display device where an exemplary embodiment of the present invention is applied. The liquid crystal display device according to the exemplary embodiment of the present invention is equipped with a direct-lighting type backlight system (backlight) 10 including a backlight frame 11 that accommodates a light-emitting portion, and an LED-substrate (mounting substrate) 12 on which plural light emitting diodes (LEDs), which are solid-state light-emitting elements, are arrayed as the light source. The backlight system 10 also includes a laminate of optical compensating sheets composed of a diffusion plate (or diffusion film) 13 that is a transparent plate (or film) scattering and diffusing light to equalize the luminosity over the entire screen and prism sheets 14 and 15 that are diffraction grating films having a function of condensing light to the front. There are also provided a liquid crystal display module 30 including a liquid crystal panel 31 in which liquid crystal is sandwiched between two glass plates, and polarization plates (polarization filters) 32 and 33 restricting the oscillation of optical wave to a given direction, each of the plates being laminated on each glass plate of the liquid crystal panel 31. The liquid crystal display device includes peripheral members (not shown in the figure) such as an LSI (Large Scale Integration) for driving.

The liquid crystal panel 31 includes various components not shown in the figure. For example, the two glass plates have display electrodes, active elements such as a thin film transistor (TFT), liquid crystal, a spacer, sealant, an orientation film, a common electrode, a protective film, a color filter, and others, none of which is shown in the figure.

Note that, the structural unit of the backlight system 10 may be changed in an arbitrary way. For example, the unit including only the backlight frame 11 with the LED-substrate 12 may be called as "backlight system (backlight)" and distributed as a service unit not including the laminate of optical compensation sheets such as the diffusion plate 13 and the prism sheets 14 and 15.

Figure 2:
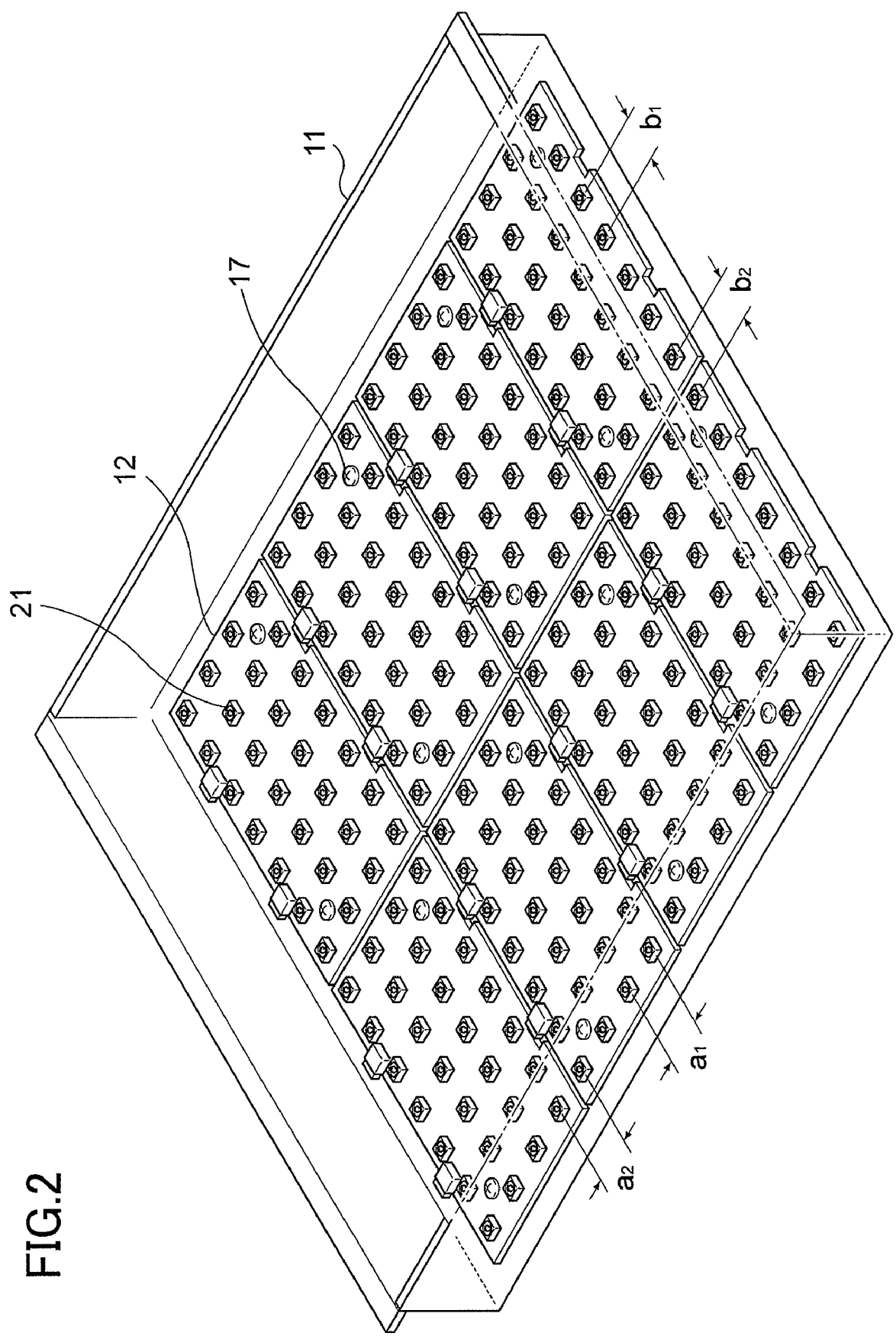
FIG. 2 illustrates the partial structure of the backlight system composed of the backlight frame equipped with plural LED-substrates.

FIG. 2 illustrates the partial structure of the backlight system 10 composed of the backlight frame 11 equipped with plural LED-substrates 12. The example shown in FIG. 2 indicates a direct-lighting type backlight system in which light sources are disposed directly beneath the rear of the liquid crystal display module 30. In this backlight configuration, LED chips are arrayed in such a manner that they are almost uniformly distributed over the entire rear surface of the liquid crystal display module 30. The example shown in FIG. 2 is different from a so-called side-lighting type in which (a) light source(s) is/are placed along one or two edge(s) of a light guide plate and uniform light on the plane by a reflecting plate, a diffusion plate, or the like.

The backlight frame 11 is a chassis made of, for example, aluminum, magnesium, iron, or an alloy thereof. The inside of the chassis is attached with, for example, a white polyester film or the like having a high performance of reflecting light, serving as a reflector. The chassis is composed of a rear plate corresponding to the size of the liquid crystal display module 30 and sidewalls enclosing the four edges of the rear plate. The rear plate or sidewalls may be provided with a heat sink structure composed of cooling fins or the like for heat dissipation, where necessary.

As shown in FIG. 2, plural pieces (8 pieces in the example shown in FIG. 2) of the LED-substrate 12 are disposed neighboring to each other, and each of them is fixed on the backlight frame 11 with plural bolts 17. On each LED-substrate 12, plural light emitting diodes (LEDs) 21 are disposed. These plural light emitting diodes (LEDs) 21 are composed of red light emitting diodes, green light emitting diodes, and blue light emitting diodes, and light emitting diodes of these colors are arrayed in accordance with a predetermined rule. They provide a light source capable of reproducing a wide range of color by mixing light from the diodes of the individual colors.

When the plural LED-substrates 12 are disposed on the backlight frame 11, the light emitting diodes (LEDs) 21 are uniformly distributed in the whole structure of the backlight. Namely, according to design where the spatial relation with the neighboring LED-substrates 12 is taken into consideration, the LED-substrate 12 is configured in such a way that, when the LED-substrate 12 is fixed on the backlight frame 11 with the bolts 17, the light emitting diode (LED) 21 on the periphery of the LED-substrate 12 is separated from the light emitting diode (LED) 21 on the periphery of the neighboring LED-substrate 12 at approximately the same distance (distance approximately equal to that from the neighboring light emitting diode 21 in a continuous array on the LED-substrate 12). In other words, in FIG. 2, a1 and b1, the distances between two continuously arrayed light emitting diodes (LEDs) 21 on the same LED-substrate, and a2 and b2, the distances between two light emitting diodes (LEDs) 21 on the peripheries of LED-substrates 12 neighboring to each other satisfy the following relations:

a1≈a2 (a1 is approximately equal to a2), and b1≈b2 (b1 is approximately equal to b2).

In this way, the light emitting diodes (LEDs) 21 mounted in the backlight frame 11, as a whole, can provide the backlight system with fine color mixing and uniform luminosity and color.

Figure 3:
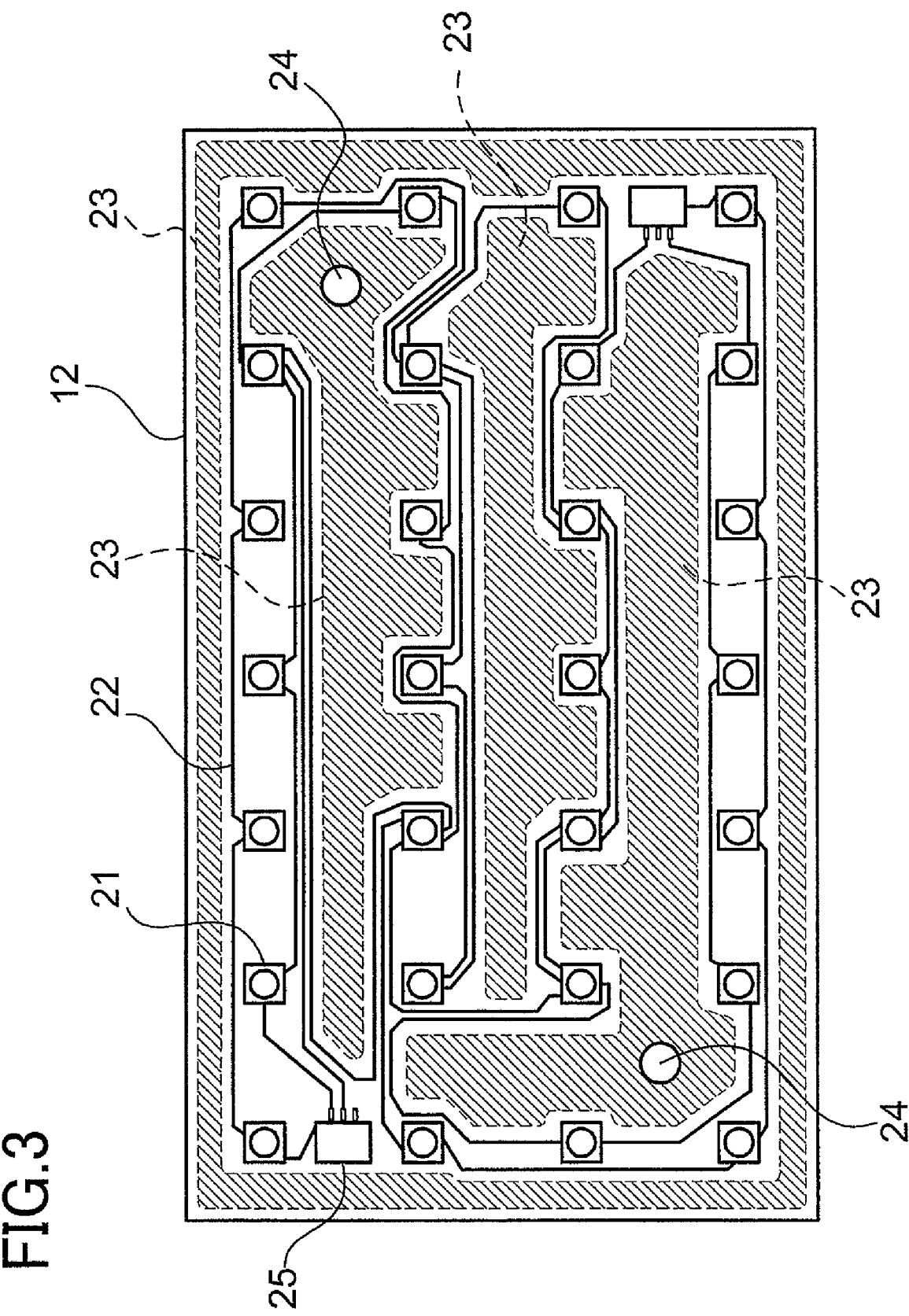
FIG. 3 illustrates the structure of the LED-substrate according to the exemplary embodiment of the present invention.

FIG. 3 illustrates the structure of the LED-substrate 12 according to the exemplary embodiment of the present invention. The LED-substrate 12 disposing the light emitting diodes (LEDs) 21 is provided with a wiring circuit 22 supplying driving current to the light emitting diodes (LEDs) 21 and holes 24 (a member having a hole) used for fixing with bolts. The wiring circuit 22 is made of copper or copper-based metallic material, for example. Each light emitting diode (LED) 21 disposed on the LED-substrate 12 is electrically connected to the wiring circuit 22. In the LED-substrate 12 according to the exemplary embodiment of the present invention, metallic film islands 23 (the hatched regions in the figure) as a heat-conducting film for heat dissipation are formed on the surface where the wiring circuit 22 is formed. The metallic film islands 23 are made of the same metallic material (for example, copper) as the wiring circuit 22, and are formed in such design that the islands have maximum area available in the region not occupied by the light emitting diodes (LEDs) 21 or wiring circuit 22. Such enlargement of the area of the metallic film islands 23 further enhances the dissipating effect on the heat generated from the light emitting diodes (LEDs) 21. The region where the metallic film islands 23 are formed has the holes 24 used for fixing with bolts 17 (see FIG. 2). The LED-substrate 12 is also equipped with a terminal 25 used for supplying the driving current to the light emitting diodes (LEDs) 21.

The metallic film islands 23 and wiring circuit 22 are formed in the same process. As a method for producing the LED-substrate 12, for example, there has been widely known a method in which unnecessary portions of a conductor are etched. In this method, firstly a double-sided copper-clad laminated board is coated with resist. In the exemplary embodiment of the present invention, the portion of the wiring circuit 22 and the region of the metallic film islands 23 are masked with such resist. After the coating, the double-sided copper-clad laminated board is prepared through baking, exposure, development, and etching, and then the resist is removed from the masked areas to form the wiring circuit 22 and the metallic film islands 23 on the LED-substrate 12. The metallic film islands 23 thus formed correspond to regions that would be removed by etching in the conventional process forming the wiring circuit 22. Therefore, no extra cost is required to form the metallic film islands 23.

As shown in FIG. 3, the predetermined regions of the metallic film islands 23 are connected to the holes 24. As illustrated in FIG. 2, the LED-substrate 12 is fixed on the backlight frame 11 with the bolts 17, whereby the metallic film islands 23 are connected to the backlight frame 11 through the bolts 17. The insulating board used as a base of the LED-substrate 12 generally has much lower heat conductivity than that of a metallic material, hence the heat generated by the light emitting diodes (LEDs) 21 is accumulated in the insulating board. Consequently, without any measure for dissipating the heat, the light emitting diodes (LEDs) 21 would be severely heated, causing problems such as lowering the light-emitting efficiency of the light emitting diodes (LEDs) 21 and damaging the light source. In the exemplary embodiment of the present invention, the metallic film islands 23 as a heat-conducting film are disposed in the vicinity of the light emitting diodes (LEDs) 21 to enhance the effect of dissipating heat outside, and also the heat absorbed by the metallic film islands 23 is released to the backlight frame 11 through the bolts 17 that is made of a highly heat-conductive material. In other words, in the exemplary embodiment of the present invention, the bolts 17 fixing the LED-substrate 12 on the backlight frame 11 also assist heat dissipation, thus achieving the heat dissipation and fixing of the LED-substrate 12 at the same time.

In some substrate structures, there is provided a hole (through-hole) for conduction between the conductors formed on the front and rear (top and bottom) of the substrate, for example, by copper-plated hole. This through-hole may have, in addition to the function of mutually connecting the conductors formed on the front and rear of the substrate, for example, a function of fixing a component by inserting the lead wires of the component into the through-hole and bonding thereto with soldering or the like. Instead of the exemplary embodiment of the present invention, this through-hole may be used for dissipating the heat from the light emitting diodes (LEDs) 21 on the front of the substrate. However, considering that formation of through-holes causes the cost increase of the substrate. The heat dissipation via the bolts 17 according to the exemplary embodiment of the present invention is markedly efficient.

The LED-substrate 12 shown in FIG. 3 has the metallic film island 23 on the periphery thereof. The LED-substrates 12 are loaded on the backlight frame 11 in an arrangement shown in FIG. 2. Therefore, each LED-substrate 12 is liable to be affected by heat from the light emitting diodes (LEDs) 21 on the neighboring LED-substrate 12. According to the exemplary embodiment of the present invention, on the periphery of the LED-substrate 12, there is formed the metallic film island 23 as a neighboring heat-conducting film, thereby assisting dissipation of the heat from the light emitting diodes (LEDs) 21 on the neighboring LED-substrate 12. Namely, in the exemplary embodiment of the present invention, the heat-dissipation measure is designed taking into consideration the effect from the neighboring substrates.

Figure 4:
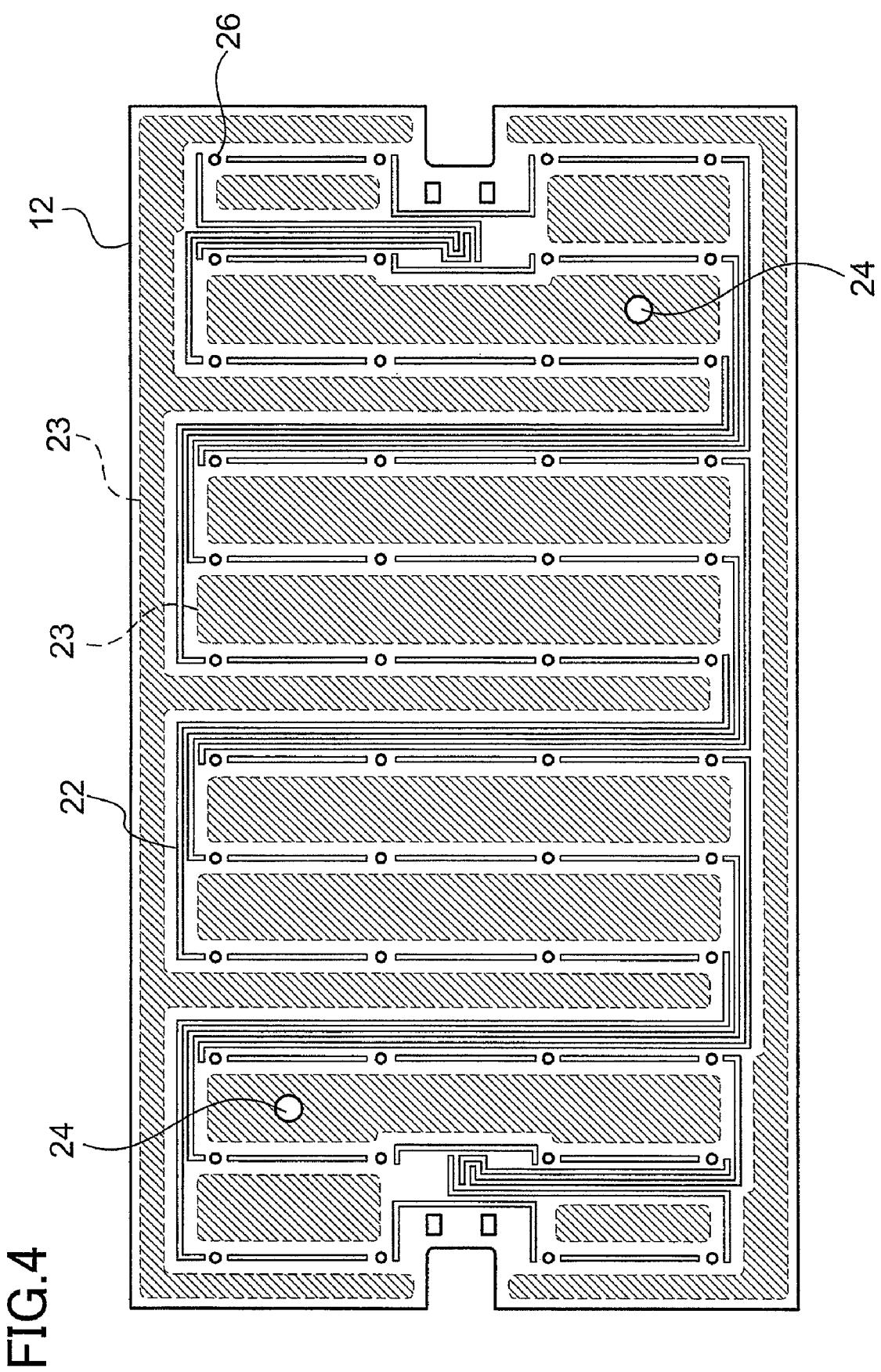
FIG. 4 illustrates another structure of the LED-substrate according to the exemplary embodiment of the present invention.

FIG. 4 shows another structure of the LED-substrate 12 according to the exemplary embodiment of the present invention. FIG. 4 shows the LED-substrate 12 before mounting the light emitting diodes (LEDs) 21 and LED-fixing holes 26 for fixing the light emitting diodes (LEDs) 21. In the example shown in FIG. 4, the area of metallic film islands 23 connecting to the holes 24 is much smaller, which results from the form of the wiring circuit 22. The effect of dissipating heat due to connection with the holes 24 is not expected as opposed to the example shown in FIG. 3. However, the metallic film islands 23 occupy larger area, so that heat accumulation in the LED-substrate 12 can be suppressed through heat dissipation from the metallic film islands 23 themselves.

The above structures according to the exemplary embodiments of the present invention provide the following effects. That is, when the light emitting diodes (LEDs) 21 in the backlight system 10 are switched-on to illuminate the liquid crystal display module 30, the light emitting diodes (LEDs) 21 generate heat with light emission. The heat from the light emitting diodes (LEDs) 21 is conducted to the metallic film islands 23 as heat-conducting films that are formed on the LED-substrate 12, or to the metallic film islands 23 as heat conducting films that are formed on the neighboring LED-substrate 12. The heat conducted to the metallic film islands 23 is directly radiated or transferred, for example, to the backlight frame 11, or the heat conducted to the metallic film islands 23 is directly conducted to the backlight frame 11 through the bolts 17. The heat conducted to the backlight frame 11 is released outside, for example, through cooling fins or the like installed on the backlight frame 11.

As described above, according to the exemplary embodiments of the present invention, the heat generated by the light emitting diodes (LEDs) 21 is dissipated through the metallic film islands 23. The metallic islands 23 are formed in the same process as the process that the wiring circuit 22 is formed in, whereby a high heat-dissipation effect can be attained while a significant cost increase is suppressed. Furthermore, the holes 24 are formed in regions where the metallic film island 23 spreads, and the heat is conducted from the holes 24 to the backlight frame 11 through the bolts 17 for fixing the LED-substrate 12, thereby enabling efficient heat dissipation.

In the examples shown in FIG. 3 and FIG. 4, the metallic film islands 23 for heat dissipation are formed separately from the wiring circuit 22. However, there may be adopted another method, where the circuit pattern, particularly the land area that mounts the light emitting diodes (LEDs) 21 is enlarged, and the holes are formed in this area to dissipate the heat toward the backlight frame 11. In this case, it is desirable to use bolts made of an insulating and highly heat-conductive material (for example, ceramics or the like) for fixing the LED-substrate 12. In this way, the heat generated by the light emitting diodes (LEDs) 21 can be efficiently conducted to the backlight frame 11 with the assistance of the circuit pattern having the enlarged land area while electrical troubles such as the leakage to the backlight frame 11 are avoided.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The invention claimed is:

1. A display device including a display panel that displays images and a backlight that illuminates the display panel from the rear thereof, the backlight comprising:
   a mounting substrate equipped with a plurality of solid-state light-emitting elements, the mounting substrate comprising a circuit formed on a surface of the mounting substrate and that supplies driving current to the plurality of the solid-state light-emitting elements, and a heat-conducting film that is formed on a same surface of the mounting substrate as the surface the circuit is formed and that conducts heat generated by the plurality of the solid-state light-emitting elements;
   a frame that loads the mounting substrate in such a manner that the plurality of the solid-state light-emitting elements are disposed facing to the display panel in a direct-lighting configuration; and
   a fixing member that fixes the mounting substrate on the frame and that conducts heat through the heat-conducting film to the frame.

2. The display device according to claim 1, wherein the backlight comprises:
   a plurality of the mounting substrates, and
   each of the plurality of the mounting substrates is fixed on the frame with the fixing member so that the plurality of the solid-state light-emitting elements are almost uniformly distributed beneath the rear of the display panel.

3. The display device according to claim 1, wherein the heat-conducting film disposed on the mounting substrate is formed in the same process as the process in which the circuit is formed.

4. The display device according to claim 1, wherein the mounting substrate comprises a member having a hole which is formed in a region where the heat-conducting film spreads.

5. The display device according to claim 4, wherein the fixing member fixes the mounting substrate on the frame via the member having the hole.

6. The display device according to claim 5, wherein the fixing member is a bolt that is made of a highly heat conductive material.

7. The display device according to claim 5, wherein the hole is a through-hole which extends through both the mounting substrate and the heat-conducting film, and
the fixing member is inserted through the hole and connects the heat-conducting film to the frame.

8. The display device according to claim 1, wherein the plurality of the solid-state light-emitting elements, the circuit and the heat-conducting film are disposed on the same surface of the mounting substrate, wherein the same surface is an upper surface of the mounting substrate which faces the display panel.

9. A display device including a display panel that displays images and a backlight that illuminates the display panel from the rear thereof, the backlight comprising:
a mounting substrate equipped with a plurality of solid-state light-emitting elements, a circuit that supplies driving current to the plurality of the solid-state light-emitting elements, and a heat-conducting film that is disposed on the same surface as where the circuit is disposed and that conducts heat generated by the plurality of the solid-state light-emitting elements;
a frame that loads the mounting substrate in such a manner that the plurality of the solid-state light-emitting elements are disposed facing to the display panel in a direct-lighting configuration;
a fixing member that fixes the mounting substrate on the frame and that conducts heat through the heat-conducting film to the frame; and
a plurality of the mounting substrates,
wherein each of the plurality of the mounting substrates is fixed on the frame with the fixing member so that the plurality of the solid-state light-emitting elements are almost uniformly distributed beneath the rear of the display panel, and
wherein the heat-conducting film disposed on each of the plurality of the mounting substrates conducts heat from the solid-state light-emitting elements mounted on neighboring mounting substrates when the mounting substrates are fixed on the frame.

10. A light-emitting device comprising:
a mounting substrate equipped with a plurality of solid-state light-emitting elements, the mounting substrate comprising a circuit formed on a surface of the mounting substrate and that supplies driving current to the plurality of the solid-state light-emitting elements, and a heat-conducting film formed on a same surface of the mounting substrate as the surface the circuit is formed and that conducts heat generated by any of the plurality of the solid-state light-emitting elements;
a frame that loads the mounting substrate; and
a fixing member that fixes the mounting substrate on the frame and that conducts the heat to the frame, the heat having been conducted to the heat-conducting film.

11. The light-emitting device according to claim 10, wherein the heat-conducting film disposed on the mounting substrate is formed in the same process as the process in which the circuit is formed.

12. The light-emitting device according to claim 10, wherein the mounting substrate comprises a member having a hole that is formed in a region where the heat-conducting film spreads.

13. The light-emitting device according to claim 12, wherein
the fixing member is made of a highly heat conductive material, and
the fixing member fixes the mounting substrate on the frame via the member having the hole.

14. The light-emitting device according to claim 13, wherein the hole is a through-hole which extends through both the mounting substrate and the heat-conducting film, and
the fixing member is inserted through the hole and connects the heat-conducting film to the frame.

15. The light-emitting device according to claim 10, wherein a rear surface of the mounting substrate is disposed on the frame, and
the plurality of the solid-state light-emitting elements, the circuit and the heat-conducting film are disposed on the same surface of the mounting substrate, wherein the same surface is an upper surface of the mounting substrate.

16. A light-emitting device comprising:
a mounting substrate equipped with a plurality of solid-state light-emitting elements, a circuit that supplies driving current to the plurality of the solid-state light-emitting elements, and a heat-conducting film that conducts heat generated by any of the plurality of the solid-state light-emitting elements;
a frame that loads the mounting substrate; and
a fixing member that fixes the mounting substrate on the frame and that conducts the heat to the frame, the heat having been conducted to the heat-conducting film;
a plurality of the mounting substrates; and
a neighboring heat-conducting film that conducts the heat from the solid-state light-emitting elements disposed on neighboring mounting substrates when the plurality of the mounting substrates are loaded on the frame.

17. The light-emitting device according to claim 16, wherein the neighboring heat-conducting film disposed on the mounting substrate is formed in the same process as the process in which the circuit is formed.

18. A solid-state light-emitting element substrate comprising:
a mounting substrate, the mounting substrate comprising:
a plurality of solid-state light-emitting elements mounted on the mounting substrate;
a circuit that is formed on a surface of the mounting substrate and that supplies driving current to the plurality of the solid-state light-emitting elements; and
a metallic film island that is formed on a same surface of the mounting substrate as the surface the circuit is formed and that is formed in the same process as the process in which the circuit is formed and that dissipates heat generated by any of the plurality of the solid-state light-emitting elements,
wherein the circuit and the heat-conducting film are made of a conductive coating laminated onto the same surface of the mounting substrate.

19. The solid-state light-emitting element substrate according to claim 18, further comprising a member having a hole that is formed in a region where the metallic film island spreads and that is used to fix the mounting substrate on a frame.

20. The solid-state light-emitting element substrate according to claim 18, wherein the metallic film island is provided by the form of the circuit.

21. The solid-state light-emitting element substrate according to claim 19, wherein the hole is a through-hole which extends through both the mounting substrate and the heat-conducting film, and a fixing member inserted through the hole and which connects the metallic film island to the frame.

22. The solid-state light-emitting element substrate according to claim 18, wherein the mounting substrate comprises an upper surface and a rear surface, and the plurality of the solid-state light-emitting elements, the circuit and the metallic film island are disposed on the same surface of the mounting substrate which is the upper surface of the mounting substrate.

* * * * *